US009630620B2

(12) United States Patent
Maruyama et al.

(10) Patent No.: US 9,630,620 B2
(45) Date of Patent: Apr. 25, 2017

(54) VEHICLE CONTROL DEVICE

(71) Applicant: Fuji Jukogyo Kabushiki Kaisha, Tokyo (JP)

(72) Inventors: Tasuku Maruyama, Tokyo (JP); Masatoshi Hoshina, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/921,834

(22) Filed: Oct. 23, 2015

(65) Prior Publication Data
US 2016/0114812 A1 Apr. 28, 2016

(30) Foreign Application Priority Data

Oct. 24, 2014 (JP) .................. 2014-217184

(51) Int. Cl.
- *B60W 30/12* (2006.01)
- *B60W 30/16* (2012.01)
- *B60W 50/08* (2012.01)
- *B60W 30/14* (2006.01)
- *B60W 50/14* (2012.01)

(52) U.S. Cl.
CPC .......... *B60W 30/12* (2013.01); *B60W 30/143* (2013.01); *B60W 30/146* (2013.01); *B60W 30/16* (2013.01); *B60W 50/082* (2013.01); *B60W 50/085* (2013.01); *B60K 2310/20* (2013.01); *B60K 2350/928* (2013.01); *B60W 2050/146* (2013.01); *B60W 2540/04* (2013.01)

(58) Field of Classification Search
CPC ..................................... B60W 30/12
See application file for complete search history.

(56) References Cited

U.S. PATENT DOCUMENTS

| 5,916,288 A | 6/1999 | Hartman |
| 7,657,352 B2* | 2/2010 | Hattori ................. B60Q 1/1407 307/10.8 |
| 2009/0192670 A1* | 7/2009 | Hara ..................... B60R 16/037 701/36 |

FOREIGN PATENT DOCUMENTS

| JP | 2009-107363 A | 5/2009 |
| JP | 2009-143354 A | 7/2009 |
| JP | 2014-152801 A | 8/2014 |
| JP | 2014-159249 A | 9/2014 |

* cited by examiner

Primary Examiner — Thomas Tarcza
Assistant Examiner — Michael Berns
(74) Attorney, Agent, or Firm — McDermott Will & Emery LLP

(57) ABSTRACT

A vehicle control device includes a single manipulandum that selects at least one of first to n-th modes in which ON/OFF states of mutually related functions are set, or a function OFF as an operation support function of a vehicle. An operation support controller selects a transition order according to the current mode when the current state is any one of the first to n-th modes, and sequentially selects each one of the first to n-th modes other than the current mode, and the function OFF based on the selected transition order, each time an operation of the manipulandum is detected. The n is a natural number of 2 or greater.

8 Claims, 7 Drawing Sheets

VEHICLE CONTROL DEVICE

CROSS-REFERENCE TO RELATED APPLICATION

The present application claims priority from Japanese Patent Application No. 2014-217184 filed on Oct. 24, 2014, the entire contents of which are hereby incorporated by reference.

BACKGROUND

1. Technical Field

The present disclosure relates to a vehicle control device, and especially to a function selecting operation of an operation support control.

2. Related Art

Japanese Unexamined Patent Application Publication (JP-A) No. 2014-152801 discloses an operation support control of the vehicle, such as automobiles, specifically, a technique about a function of cruise control with an intervehicle distance control (ACC: Adaptive Cruise Control). JP-A No. 2014-159249 discloses a technique about a function of active lane keeping (ALK: Active Lane Keep).

When various kinds of operation support functions are incorporated into a vehicle, an operator needs to select one or some of the operation support functions during operation of the vehicle. Here, if two kinds of modes are provided as the operation support functions, the operator needs to perform two operations: a selection of first or second mode and a selection of turning ON or OFF of the mode. Thus, if two kinds of switches of a function ON/OFF manipulandum and a mode selection manipulandum are mounted to the vehicle, the number of switches increases. Therefore, a space for the switches is needed and the cost increases. Meanwhile, in order to enable it to select multiple modes and the function OFF with only one switch, a circuit type switch may be provided to allow the operator to select each of the modes and the function OFF. However, in such a case, this kind of switch does not provide an instinctive operability because the number of operations to a target position (i.e., the mode or the function OFF) differs according to the present position or mode. Further, since the time period during which the operator's eyes move is extended, it is not preferred in terms of safety.

SUMMARY OF THE INVENTION

It is desirable to reduce the number of manipulandum for selecting operation support functions, and allow an operator to instinctively and safely perform a selecting operation of the operation support functions.

According to one aspect of the present disclosure, a vehicle control device includes a single manipulandum that selects at least one of first to n-th modes in which ON/OFF states of mutually related functions are set, or a function OFF as an operation support function of a vehicle, and an operation support controller that selects a transition order according to the current mode when the current state is any one of the first to n-th modes, and sequentially selects each one of the first to n-th modes other than the current mode, and the function OFF based on the selected transition order, each time an operation of the manipulandum is detected. The n is a natural number of 2 or greater.

The manipulandum may be configured to be selectable of one or more non-related modes in which one or more functions that are not turned on simultaneously with the functions of the first to n-th modes are turned ON. When the current state is any one of the first to n-th modes, the operation support controller may select the transition order according to the current mode, and may sequentially select each one of the first to n-th modes other than the current mode, the function OFF, and the non-related mode based on the selected transition order each time the operation of the manipulandum is detected. When the current state is the non-related mode, the operation support controller may select the transition order according to the non-related mode, and may sequentially select the function OFF and each one of the first to n-th modes based on the selected transition order each time the operation of the manipulandum is detected.

The vehicle control device may further include a display unit that is visible by an operator. The operation support controller may display on the display unit a selecting operation image where the current state transition order is explicitly indicated, and may present in the selecting operation image the currently selected state according to the operation of the manipulandum.

The functions of which ON/OFF states are set in the first to n-th modes may include a cruise control function with an intervehicle distance control, and a lane center keep function. Further, the function that is turned on in the non-related mode may be a speed limiting function.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

1. Operation Support Function of Implementation

Hereinafter, one implementation of an operation support control device which is to be mounted to the vehicle is described. Note that in this implementation, one example (first example) in which a first mode, a second mode, and a function OFF can be selected by a single manipulandum regarding operation support functions, and one example (second example) in which the first mode, the second mode, the function OFF, and a non-related mode can be selected by a single manipulandum, will be described.

The first mode and the second mode are modes in which ON/OFF states of functions that are mutually related are selected. Examples of the functions include a function of cruise control (cruise control function) with an intervehicle distance control (ACC: Adaptive Cruise Control) and a function of lane center keep (lane center keep function, ALK: Active Lane Keep). These functions are abbreviated as "ACC" and "ALK," respectively. The first mode is a mode in which ACC is turned ON, and the second mode is a mode in which both ACC and ALK are turned ON. On the other hand, the non-related mode is a mode, in which one or more functions which are not functionally turned ON simultaneously with the functions which are turned ON in the first and second modes (ACC, ALK), is turned ON. Specifically, the function of the non-related mode may be a speed limiting function. This function is abbreviated as "Speed Limiter" or "Lim."

ACC is a function in which, if another vehicle (leading vehicle) is not obtained ahead a vehicle to which the operation support control device is mounted (hereinafter, simply referred to as "the vehicle" in order to be distinguished from another vehicle or other vehicles), the vehicle travels at a constant target speed which is set by an vehicle operator (preset traveling speed), and if the leading vehicle is obtained, the vehicle performs a following travel control to follow the leading vehicle with a predetermined intervehicle distance when the leading vehicle travels at a traveling speed equal to or below the preset traveling speed. ALK is a function to perform the lane center keep and a lane deviation control. The lane center keep assists a steering operation so that the vehicle is maintained at the center of a lane when the vehicle travels at a predetermined speed or above, and the lane deviation control urges a caution to the operator when the vehicle is about to deviate from a lane while assisting a steering operation so that a deviation of the vehicle from the lane is prevented. Speed Limiter (Lim) is a function to keep the traveling speed of the vehicle at a predetermined speed or below when the controls of ACC or ALK are not performed even when the operator operates an accelerator pedal. For example, if the limiter is set at 100 km/h, the control is performed so that the traveling speed of the vehicle does not reach 100 km/h or above even when the operator steps on the accelerator pedal.

2. Entire System Configuration

Figure 1A:
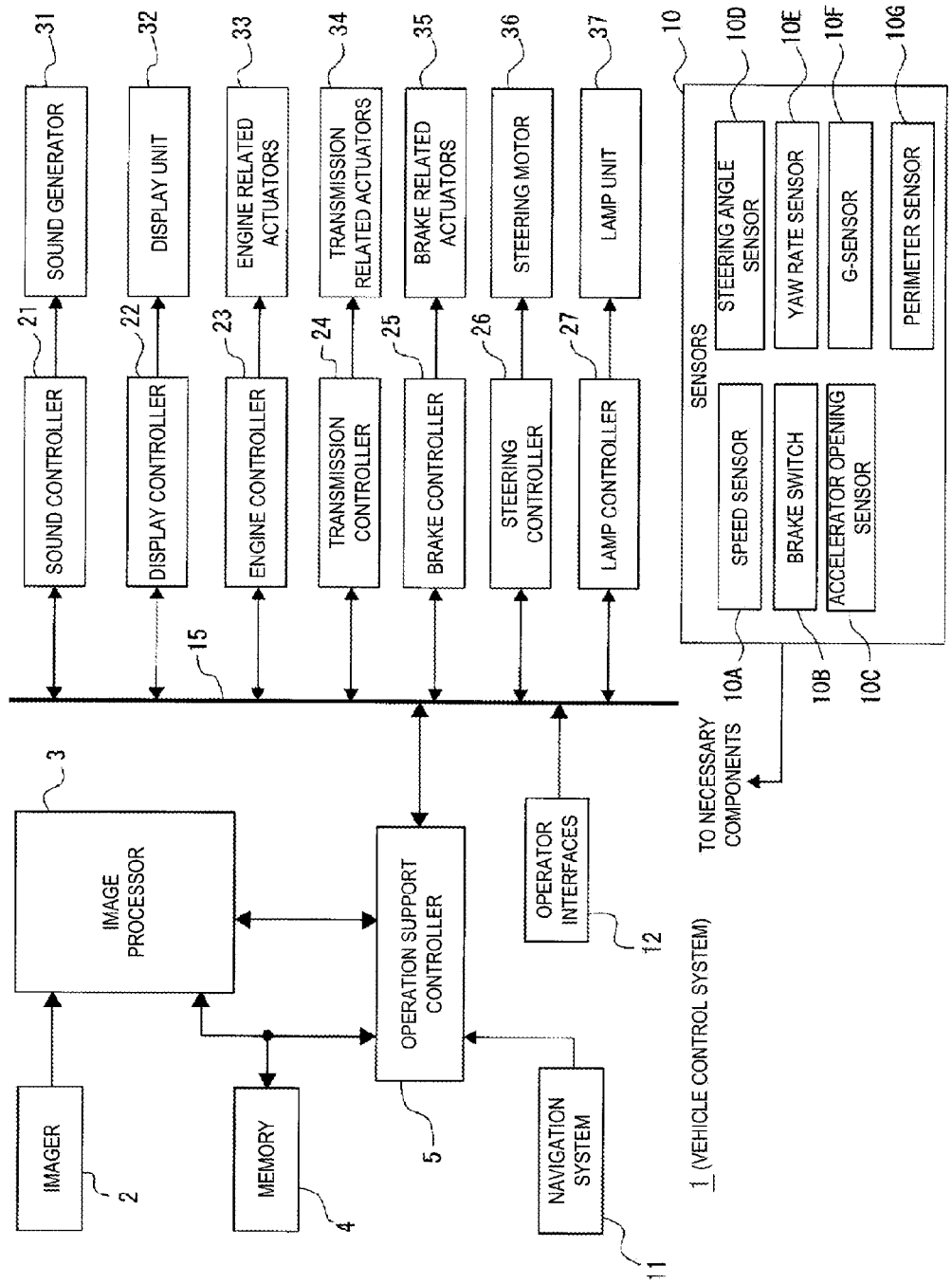
FIG. 1A is a block diagram illustrating a vehicle control system according to one implementation of the present disclosure, and FIG. 1B schematically illustrates one example of a manipulandum.

FIG. 1A illustrates a configuration of a vehicle control system 1 including a vehicle control device as the implementation according to the present disclosure. Note that only a configuration of a substantial part which is relevant to the present disclosure is mainly extracted from the configuration of the vehicle control system 1 and illustrated in FIG. 1A. The vehicle control system 1 includes an imager 2, an image processor 3, a memory 4, an operation support controller 5, sensors 10, a navigation system 11, operator interfaces 12, a sound controller 21, a display controller 22, an engine controller 23, a transmission controller 24, a brake controller 25, a steering controller 26, a lamp controller 27, a sound generator 31, a display unit 32, engine related actuators 33, transmission related actuators 34, brake related actuators 35, a steering motor 36, a lamp unit 37, and a bus 15, which are all provided to the vehicle.

The image processor 3 executes a predetermined image processing for recognizing an environment outside the vehicle (vehicle external environment) based on imaging data which is obtained from the imager 2 imaging the environment in a traveling direction of the vehicle (front or forward in this example). The image processing by the image processor 3 is performed using the memory 4 which may be a nonvolatile memory. Two camera units are provided to the imager 2. Each camera unit is comprised of a camera optical system and image sensors, such as CCDs (Charge Coupled Devices) or CMOSs (Complementary Metal Oxide Semiconductors). In each camera unit, an image of a photographic object is formed on an imaging surface of the image sensors through the camera optical system, and the camera unit acquires electrical signals per pixel which correspond to quantities of light received by the respective image sensors. Each camera unit is mounted so as to be measurable of a distance by a so-called stereo imaging method. The electrical signals obtained by each camera unit are then applied with A/D conversions and predetermined correcting processings, and supplied to the image processor 3 as digital image signals (imaging data) which indicate luminosity values of a predetermined gradation per pixel. The image processor 3 executes various kinds of image processings based on each imaging data obtained by the stereo imaging. Thus, a lane detection, a leading vehicle detection, an obstruction detection, a traffic light detection, etc. can be performed.

The operation support controller 5 is comprised of, for example, one or more microcomputers which include one or more CPUs (Central Processing Units), one or more ROMs (Read Only Memories), RAMs (Random Access Memories), etc. As a result of the image processing by the image processor 3, various kinds of control processings for the operation support are performed based on detected information obtained from the sensors 10, operational inputs from the operator interfaces 12, and/or a route information and/or road information from the navigation system 11. The operation support controller 5 is connected via the bus 15 with the sound controller 21, the display controller 22, the engine controller 23, the transmission controller 24, the brake controller 25, the steering controller 26, and the lamp controller 27 which may be similarly comprised of the microcomputer. Thus, the operation support controller 5 is possible to perform bidirectional data communications with these controllers. The operation support controller 5 outputs instruction(s) to necessary controller(s) among the controllers described above, and cause the necessary controller(s) to execute operation(s) according to the operation support. Specifically, the operation support controller 5 performs control processings for implementing various functions, such as ACC, ALK, and Speed Limiter, as described above.

The sensors 10 comprehensively represent various kinds of sensors and manipulandum which are provided to the vehicle. The sensors which sensors 10 have include a speed sensor 10A which detects a traveling speed of the vehicle, a brake switch 10B which is turned ON/OFF according to an operating state or a non-operating state of a brake pedal, an accelerator opening sensor 10C which detects an accelerator opening based on a stepping amount of the accelerator, a steering angle sensor 10D which detects a steering angle, a yaw rate sensor 10E which detects a yaw rate, and a G-sensor 10F which detects acceleration. In addition, a perimeter sensor 10G which detects a situation around the vehicle is provided. The perimeter sensor 10G includes a radar, a camera, etc. which detect objects (e.g., other vehicles, obstructions, etc.) located rearward or sideward of the vehicle. Although illustration is omitted, other sensors, such as an engine speed sensor, an intake air quantity sensor which detects a quantity of intake air, a throttle position sensor which is provided in an intake passage and detects an opening of a throttle valve for adjusting the intake air quantity supplied to each engine cylinder, a water temperature sensor which detects a temperature of coolant which represents an engine temperature, and an external air temperature sensor which detects a temperature outside the vehicle, are also provided.

Figure 1B:
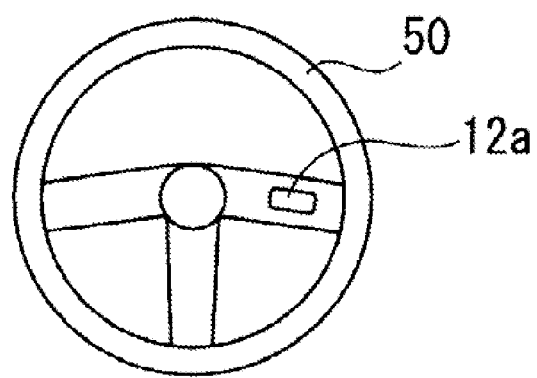

The operator interfaces 12 comprehensively represent various kinds of manipulandum which is operable by the operator. The manipulandum includes an ignition switch which gives an instruction of a start/stop of the engine, select levers which select an automatic transmission mode or a manual transmission mode in an automatic transmission (AT) vehicle and give an instruction of an upshift/downshift when the manual transmission mode is selected, a display change-over switch which switches displayed information on a Multi Function Display (MFD) provided to the display unit 32 described later, and a blinker lever which instructs a blinker to blink. As one of the manipulandum in the operator interfaces 12, a mode switch 12*a* for a selection of mode which causes the operation support controller 5 to execute a predetermined function is provided, for example, to a steering wheel 50, as illustrated in FIG. 1B. The operator can operate the mode switch 12*a* to select the first mode (ACC), the second mode (ACC+ALK), or the function OFF [first example, described later]. Alternatively, the operator can operates the mode switch 12*a* to select the first mode, the second mode, the function OFF, or the non-related mode (Lim) [second example, described later].

The navigation system 11 comprehensively represents a configuration for navigation processing, and includes a microprocessor which performs processings of a route assistance or a current location indication, a map database, a display device, an input device, a sound output device. Although detailed description of the configuration and processing of the navigation system 11 is omitted because they are known generator, the operation support controller 5 can acquire road information and lane information from the navigation system 11.

The sound generator 31 outputs a voice guidance, a voice message, etc. to the operator and passenger(s) of the vehicle. Thus, the sound generator is provided with a sound source unit, a voice amplifying circuit unit, a loudspeaker, etc. The sound generator 31 outputs necessary voice guidance etc. from the loudspeaker by a control of the sound controller 21. For example, as the sound output by the sound generator 31, a lane deviation warning during an automatic driving, a lane change proposal, a right or left turn, a traveling route, a situation, etc. are informed to the operator. Note that the sound generator 31 and the sound controller 21 may be commonly used with a sound output by a function of the navigation system 11, and a sound output of a car audio system.

The display unit 32 comprehensively represents various kinds of meters, such as a speedometer and a tachometer, provided in a meter panel installed in front of the operator, MFD, and a display device which presents other information to the operator. Various kinds of information, such as a total mileage, an instantaneous fuel consumption of the vehicle, the outside air temperature, etc. are simultaneously or selectively displayed on MFD. In addition, an image for the selecting operation (selecting operation image) is displayed, for example, on a part of MDF, according to an operation by the operator through the mode switch 12*a*. In this example, the selecting operation image explicitly presents an order of states which transits according to the current state, and presents a state under a selection according to an operation by the operator through the mode switch 12*a*, as will be described later. The display controller 22 controls a display operation performed by the display unit 32 based on detection signals from the predetermined sensors among the sensors 10, the operational input through the manipulandum, and an instruction from the operation support controller 5, etc. For example, it is possible to display a predetermined heads-up message, an automatic driving situation, a selecting operation image for the mode selection, etc. as part of the operation support on the display unit 32 (e.g., a predetermined area of MFD) based on the instructions from the operation support controller 5.

The engine controller 23 controls various kinds of actuators provided as the engine related actuators 33 based on the detection signals from the predetermined sensors among the sensors 10, the operational input by the operator through the manipulandum of the operator interface 12, etc. Various kinds of actuators for driving the engine, such as a throttle actuator which drives a throttle valve, an injector which injects fuel into engine cylinder(s) are provided as the engine related actuators 33. For example, the engine controller 23 performs an engine start/stop control according to an operation by the operator through the ignition switch described above. The engine controller 23 also performs controls of a fuel injection timing, a fuel injection pulse width, the throttle opening, etc. based on the detection signals from the predetermined sensors, such as the engine speed sensor and the accelerator opening sensor 10C. When the operation support control is performed, the engine controller 23 also controls necessary engine related actuators 33 based on an acceleration/deceleration instruction from the operation support controller 5.

The transmission controller 24 controls various kinds of actuators provided as the transmission related actuators 34 based on the detection signals from the predetermined sensors among the sensors 10, the operational input by the operator through the manipulandum of the operator interface 12, etc. The transmission related actuators 34 include various kinds of actuators related to the transmission, such as a control valve which controls gear shifts of the automatic transmission, and a lock-up actuator which carries out a lock-up operation of a lock-up clutch. For example, when the automatic transmission mode is selected by the select lever described above, the transmission controller 24 outputs a gear shift signal to the control valve according to a predetermined transmission pattern to perform the transmission control. On the other hand, when the manual transmission mode is selected, the transmission controller 24 outputs the gear shift signal according to an upshift/downshift instruction by the select lever to the control valve to perform the transmission control. Further, when the operation support control is performed, the transmission controller 24 outputs the gear shift signal to the control valve based on an upshift/downshift instruction from the operation support controller 5 to perform the transmission control.

The brake controller 25 controls various kinds of actuators provided as the brake related actuators 35 based on the detection signals from the predetermined sensors among the sensors 10, the operational input by the operator through the manipulandum of the operator interface 12, etc. The brake related actuators 35 include various kinds of brake related actuators, such as a fluid pressure control actuator which controls an output fluid pressure from a brake booster to a master cylinder, and a fluid pressure inside a brake fluid piping. For example, when the operation support controller 5 instructs a turning ON of the brake, the brake controller 25 controls the fluid pressure control actuator described above to brake the vehicle. The brake controller 25 also calculates slip ratios of wheels based on the detected information from the predetermined sensors (e.g., rotational speed sensors of axles, and the speed sensor 10A), and increases or decreases fluid pressures by the fluid pressure control actuator described above according to the slip ratio to achieve a so-called Antilock Brake System (ABS) control.

The steering motor 36 is a motor which is attached to a steering mechanism and achieves a steering separately from a steering operation by the operator. The steering controller 26 drives the steering motor 36 based on an instruction from the operation support controller 5 to perform the automatic steering and assist the steering by the operator (steering assistance). For example, the steering controller 26 executes an automatic steering control under the automatic driving control, and an automatic steering control for the lane keep traveling by ALK.

The lamp unit 37 comprehensively represents various kinds of lamps or illuminations mounted to the vehicle, headlights, reversing lights, blinker lamps, stop or brake lamps, etc. The lamp controller 27 performs a lighting (blinking) control of necessary lights or lamps of the lamp unit 37 based on the detection signals from the predetermined sensors among the sensors 10, the operational input by the operator through the manipulandum of the operator interface 12, etc. Further, the lamp controller 27 may perform the lighting or blinking control of the lamp unit 37 in response to an instruction from the operation support controller 5.

3. Processing Corresponding to Mode Operation (First Example)

A processing corresponding to the mode operation of the operation support controller 5 when the mode switch 12a is operated (first example) is described. The first example is an example in which the first mode (ACC ON), the second mode (ACC and ALK ON), and the function OFF can be selected by the operator pushing the mode switch 12a.

Figure 2A:
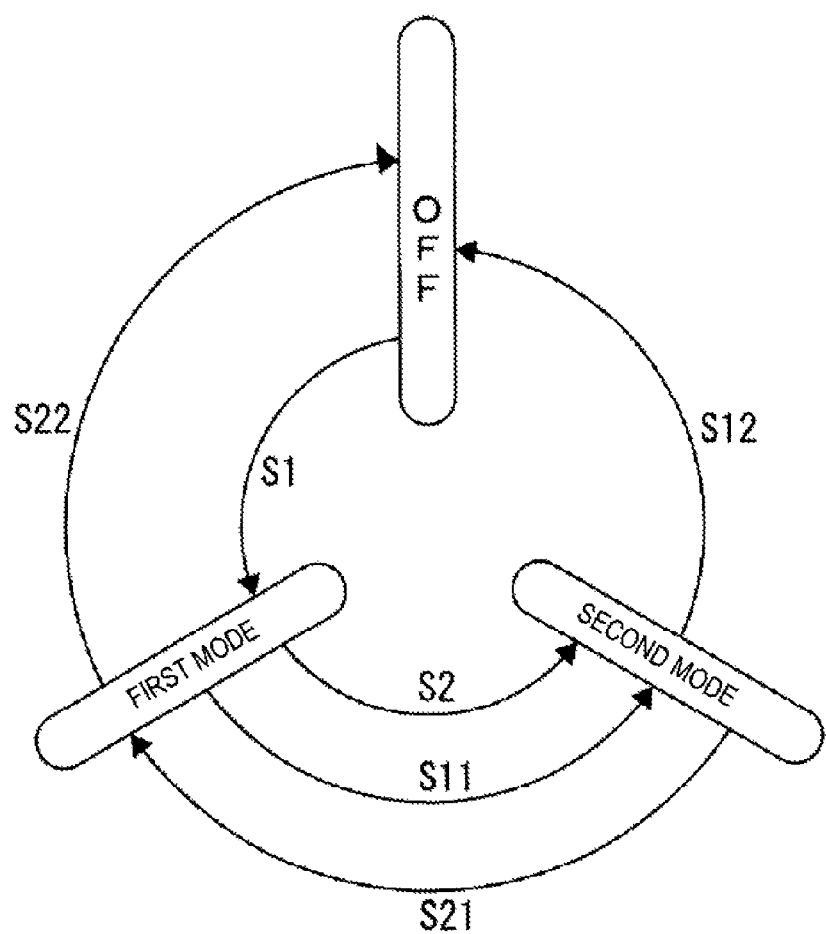
FIGS. 2A and 2B are diagrams illustrating mode transitions according to operations of the implementation.

A transition state in the first example is illustrated in FIG. 2A. In this implementation, an order of transition of the mode or functions (transition order) differs according to the current state. In a case in which the current state is the function OFF, when the operator pushes the mode switch 12a, the state changes into the first mode (S1), and when the operator pushes the mode switch 12a again, the state changes into the second mode (S2). In a case in which the current state is the first mode, when the operator pushes the mode switch 12a, the state changes into the second mode (S11), and when the operator pushes the mode switch 12a again, the state changes into the function OFF (S12). In a case in which the current state is the second mode, when the operator pushes the mode switch 12a, the state changes into the first mode (S21), and when the operator pushes the mode switch 12a again, the state changes into the function OFF (S22). That is, when the current state is the first mode or the second mode, a change into the other mode can be performed by a single operation. Further, when the current state is either the first mode or the second mode, a change into the function OFF can be performed by twice operations of the mode switch 12a. Thus, the operator can recognize that a single operation corresponds to a change in the mode, and twice operations correspond to OFF of the function or mode.

Figure 3:
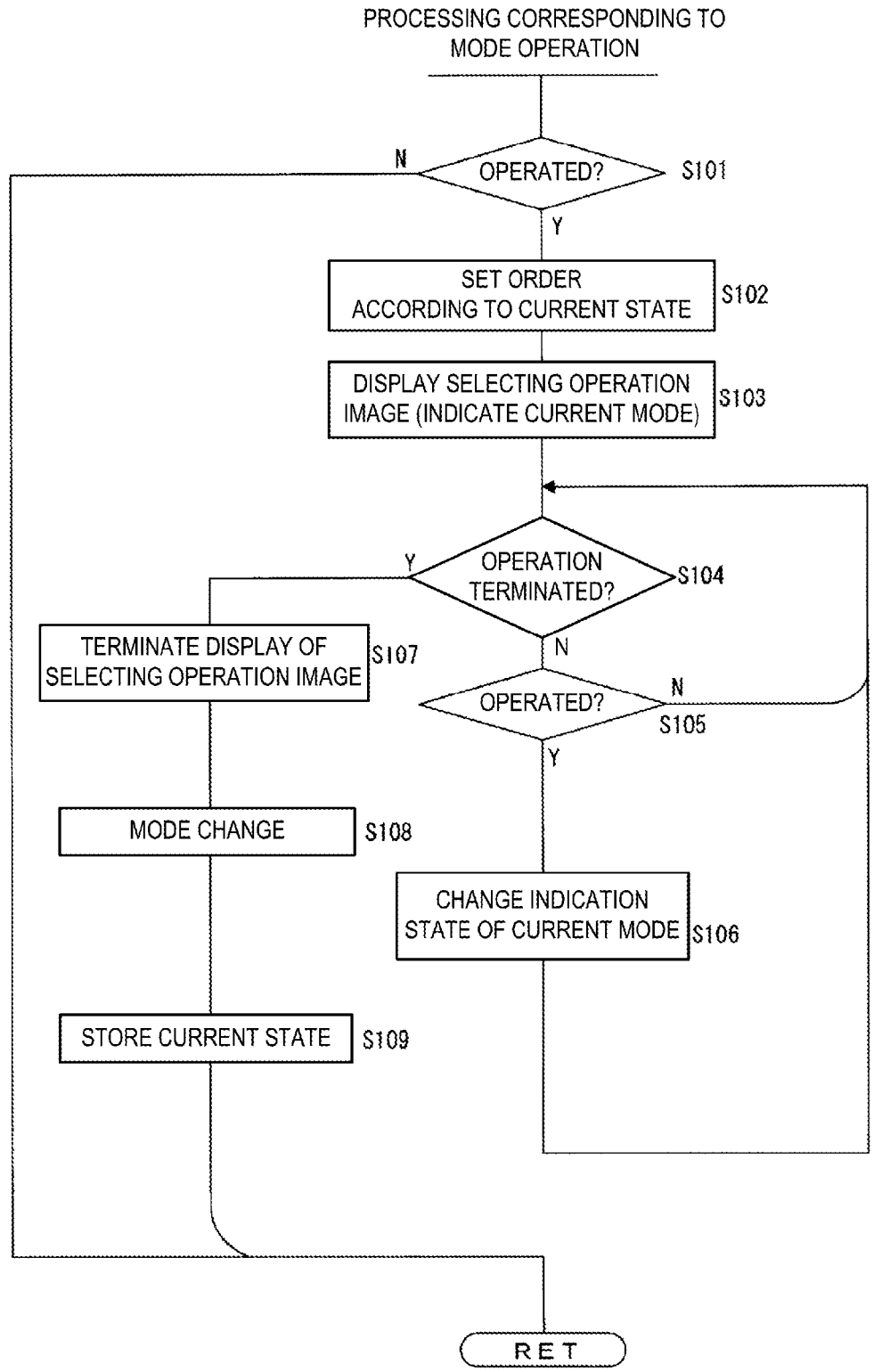
FIG. 3 is a flowchart illustrating a processing corresponding to a mode operation of the implementation.

Processing of the operation support controller 5 for achieving such a mode operation correspondence is illustrated in FIG. 3. The operation support controller 5 repeatedly executes processing corresponding to the detection of the mode switch 12a of FIG. 3 as one of the various kinds of processings of the automatic driving control, for example, at every predetermined timing.

At step S101, the operation support controller 5 monitors an existence of the operation by the operator through the mode switch 12a. If the operation is not detected, the operation support controller 5 ends this processing as it is.

Figure 4:
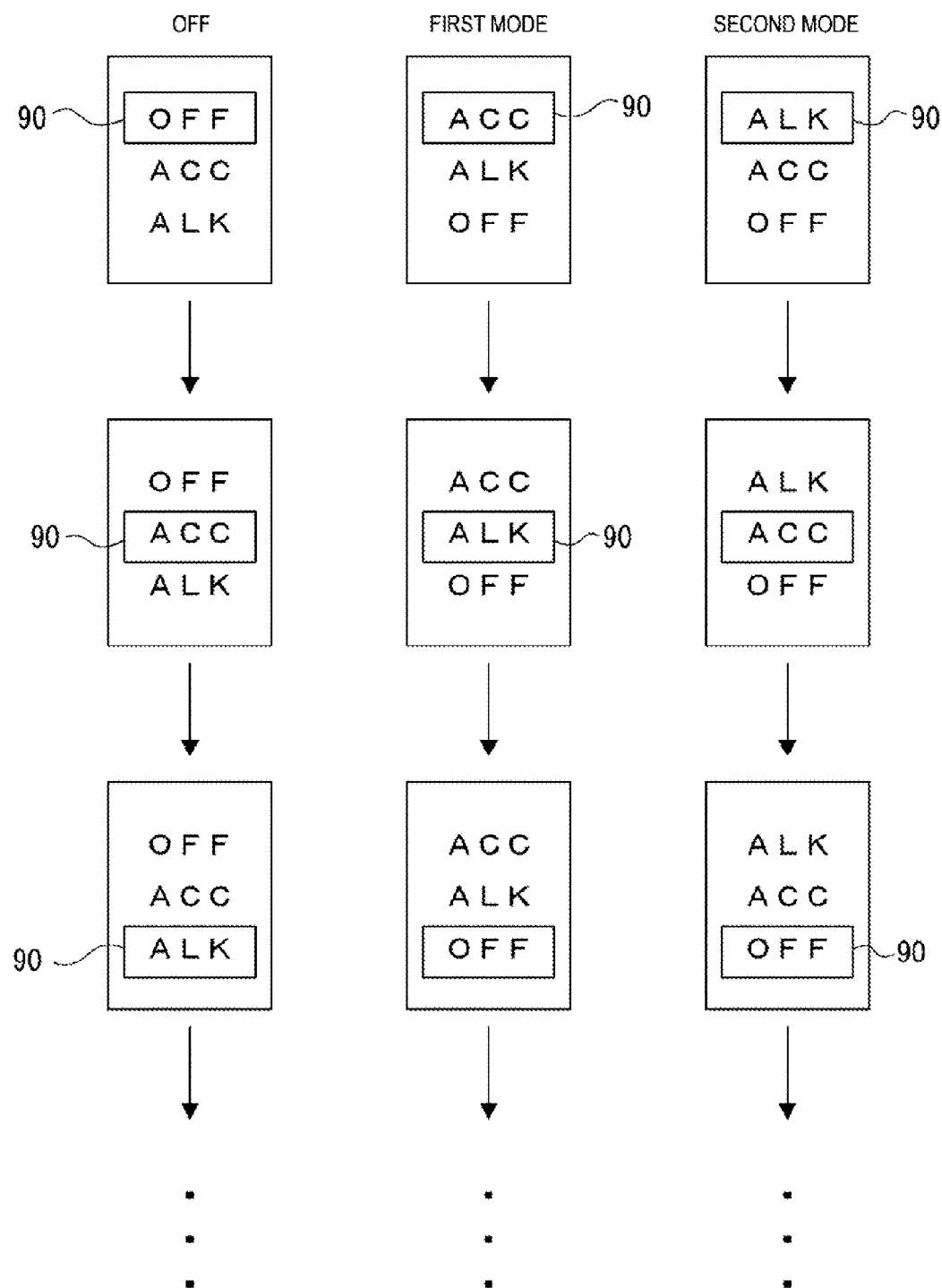
FIG. 4 is a diagram illustrating a display example at the time of the mode operation in a first example of the implementation.
Figure 5:
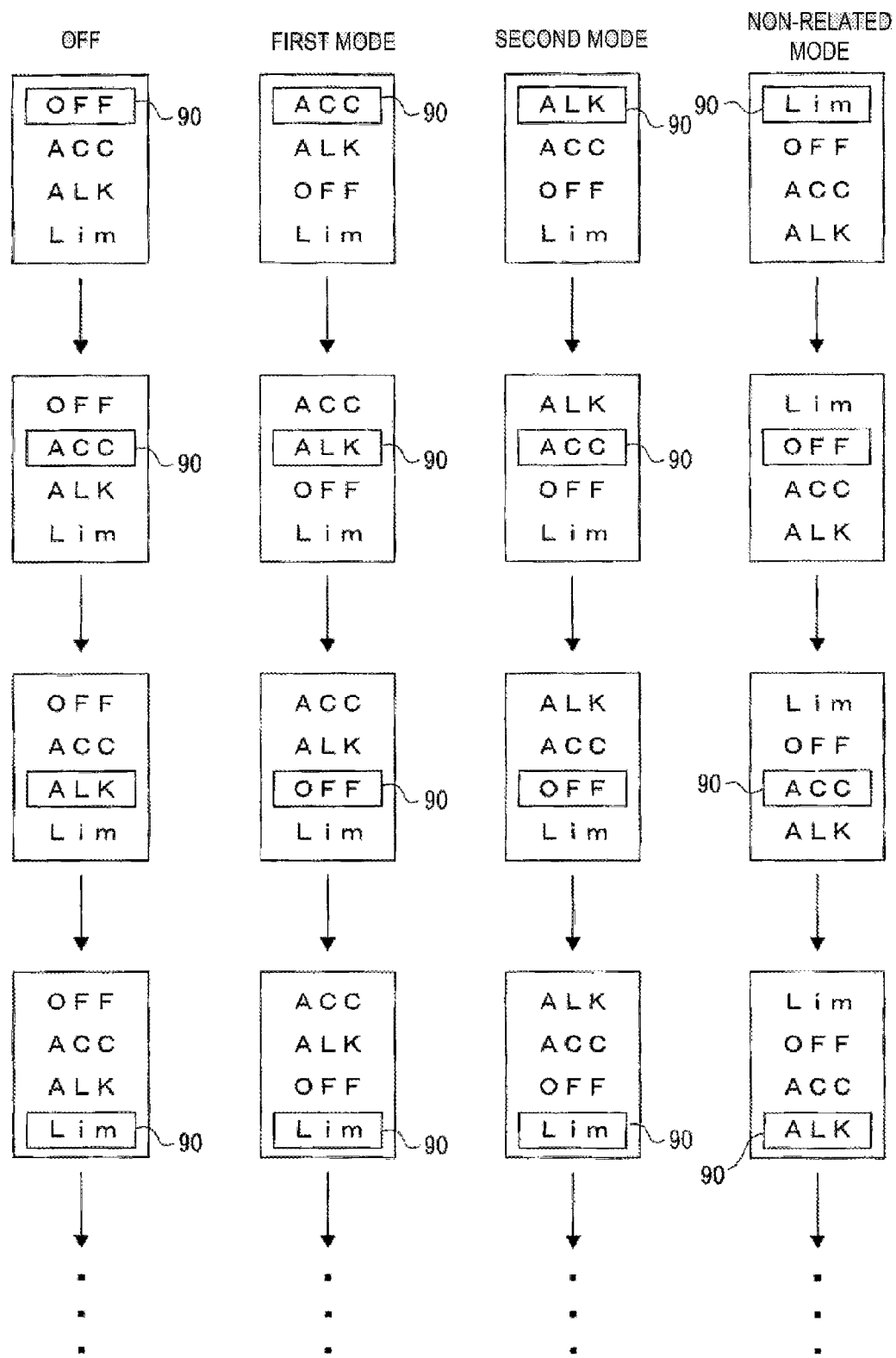
FIG. 5 is a diagram illustrating a display example at the time of the mode operation in a second example of the implementation.

If the operation by the operator through the mode switch 12a is detected, the operation support controller 5 transits the processing to step S102 where a transition order is set according to the current state, and then at step S103, the operation support controller 5 instructs the display controller 22 to display on the display unit 32 the selecting operation image according to the setting of the transition order. For example, one of the images illustrated in the top row of FIG. 4 is displayed on MFD. In addition, the current state is indicated by a cursor 90. Note that, in consideration of ALK being a function which is additionally turned ON when ACC ON state, the first mode is indicated as "ACC," and the second mode is indicated as "ALK" in FIG. 4 (and FIG. 5 described later). FIGS. 4 and 5 illustrate examples of the selecting operation image which are visible by the operator. In the following description about the transition order, "ALK" refers to the second mode.

The transition order which is set by the operation support controller 5 at the step S102 described above is at least the order described in FIG. 2A until the twice operations are performed, and is as follows, for example. If the current state is the function OFF, the state transits as OFF→ACC→ALK . . . for every operation by the operator through the mode switch 12a ("→" indicates the operation). That is, the current state of the function OFF transits to the first mode by the first operation, and to the second mode by the second operation. If the current state is the first mode (ACC), the state transits as ACC→ALK→OFF . . . for every operation by the operator through the mode switch 12a. That is, the current state of the first mode transits to the second mode by the first operation, and to the function OFF by the second operation. If the current state is the second mode (ALK), the state transits as ALK→ACC→OFF . . . for every operation by the operator through the mode switch 12a. That is, the current state of the second mode transits to the first mode by the first operation, and to the function OFF by the second operation.

Thus, a display of the transition order is performed according to the current state at step S103. That is, any one of the images in the top row of FIG. 4 is displayed according to the current state. As illustrated in each image in the top row of FIG. 4, the transition order (an indicating order of OFF, ACC and ALK) differs according to the current state. Further, the cursor 90 illustrates the current state in the displayed image. That is, according to the processing at step S103, the first operation by the operator through the first mode switch 12a is considered as a starting operation of the mode select, and the selecting operation image in the top row of FIG. 4 is displayed. A subsequent operation by the operator through the mode switch 12a is treated as an actual mode selecting operation. Therefore, the operator can recognize the current state by looking at the selecting operation image in the top row of FIG. 4, and, in addition, he/she can easily understand that the mode is selectable by operating the mode switch 12a to sequentially move the cursor 90 in the order.

The operation support controller 5 determines whether it reaches a timing of a termination of the mode selecting operation at step S104. Further, the operation support controller 5 monitors the operation by the operator through the mode switch 12a at step S105. For example, the operation support controller 5 determines the termination timing of the mode selecting operation if a subsequent operation by the operator through the mode switch 12a has not been detected for a predetermined period of time (e.g., 5 or 10 seconds) or longer after the last operation by the operator through the mode switch 12a was detected.

If the subsequent operation by the operator through the mode switch 12a is detected before the determination of the termination of the mode selecting operation is made, the operation support controller 5 then transits to step S106 from step S105 each time of the detection, where the operation support controller 5 instructs the display controller 22 to change the indication of the current state. For example, the cursor 90 is moved so as to be a state in the middle row from the state in the top row of FIG. 4. The operator can recognize that the selected state changes by the operation of the state transition as the cursor 90 is moved according to the operation by the operator through the mode switch 12a.

If it is determined as the termination of the operation (the termination of the mode selecting operation) at step S104, the operation support controller 5 then transits the processing to step S107 where the operation support controller 5 instructs the display controller 22 to terminate the display of the selecting operation image. Thus, the display of any one of the images for operation of FIG. 4 which is currently displayed is ended. Then, the operation support controller 5 performs a mode change processing at step S108. That is, the operation support controller 5 recognizes that the finally selected state at this moment (the mode state selected by the cursor 90 when the display is terminated) is a finally selected and decided state, performs the mode change processing so that the actual state matches the selected state, and controls a start or stop of the necessary function according to this change. The operation support controller 5 stores the current (latest) mode state (i.e., any one of the function OFF, the first mode, and the second mode) which was changed, at step S109. For example, the mode state is stored in a nonvolatile storage area provided inside the operation support controller 5. This allows the operation support controller 5 to recognize the current state when a next operation by the operator through the mode switch 12a is detected at step S101. In addition, the operation support controller 5 is able to recognize the finally selected mode, for example, when a restart of the engine after the engine is once cut off.

Since the operation support controller 5 performs the processing of FIG. 3 described above, the operator can first give the instruction to display the image for operation by the single operation, and can then select any of the mode states by the necessary number of operations during the period until the display is ended.

Note that the transition order according to the current state includes various kinds of transitions for the third and subsequent operations among a series of operations until the termination of the operation is determined at step S104. For example, the state may return to the state in the top row or may return to the state in the middle row, depending on the operation by the operator through the mode switch 12a after the cursor transits to a state in the bottom row of FIG. 4. The transition order when returning from the bottom row to the top row at the third operation is as follows.

The current state is OFF: OFF→ACC→ALK→OFF→ACC→ALK . . . .

The current state is the first mode: ACC→ALK→OFF→ACC→ALK→OFF . . . .

The current state is the second mode: ALK→ACC→OFF→ALK→ACC→OFF . . . .

The transition order when returning from the bottom row to the middle row at the third operation is as follows.

The current state is OFF: OFF→ACC→ALK→ACC→OFF . . . .

The current state is the first mode: ACC→ALK→OFF→ALK→ACC . . . .

The current state is the second mode: ALK→ACC→OFF→ACC→ALK . . . .

4. Processing Corresponding to Mode Operation (Second Example)

A processing corresponding to the mode operation of the operation support controller 5 when the mode switch 12a is operated (second example) is described. The second example is an example in which the first mode (ACC ON), the second mode (ACC and ALK ON), the function OFF, and the non-related mode (Speed Limiter ON) can be selected by the operator pushing the mode switch 12a.

Figure 2B:
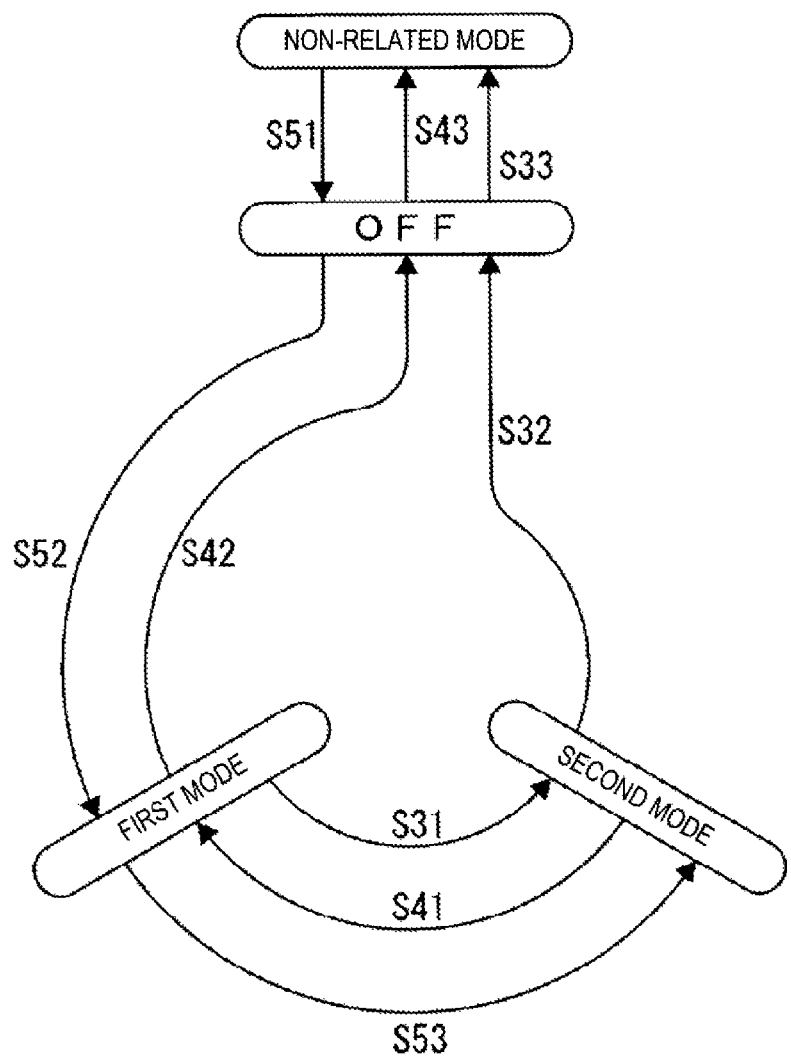

A transition state in the second example is illustrated in FIG. 2B. In this case, the transition order also differs according to the current state. In a case in which the current state is the first mode, when the operator pushes the mode switch 12a, the state changes into the second mode (S31), and when the operator pushes the mode switch 12a again, the state changes into the function OFF (S32). Then, when the operator pushes the mode switch 12a once again, the state changes into the non-related mode (S33). In a case in which the current state is the second mode, when the operator pushes the mode switch 12a, the state changes into the first mode (S41), and when the operator pushes the mode switch 12a again, the state changes into the function OFF (S42). Then, when the operator pushes the mode switch 12a once again, the state changes into the non-related mode (S43). In a case in which the current state is the non-related mode, the state transits to the function OFF when the operator pushes the mode switch 12a (S51). When the operator pushes the mode switch 12a once again, the state changes into the first mode (S52), and when the operator pushes the mode switch 12a again, the state changes into the second mode (S53). Although a case in which the current state is the function OFF is not illustrated, this case includes an example in which the state transits from the function OFF to the first mode→the second mode→the non-related mode, and an example in which the state transits from the function OFF to the first mode→the second mode→the function OFF→the non-related mode. Further, the case also includes an example in which the state transits from the function OFF to the non-related mode→the first mode→the second mode.

Even in this second example, the change in the other mode can be performed by a single operation when the current state is the first mode or the second mode. In addition, the state can be changed into the function OFF by twice operations in any of the first and second modes. Thus, the operator can recognize that the single operation corresponds to the change in the mode, and the twice operations correspond to OFF of the function or mode. Further, when the current state is the first mode or the second mode, an operation after the function is turned OFF (i.e., a third operation) transits the state into the non-related mode, and when the current state is the non-related mode, an operation after the function is turned OFF (i.e., the second operation) transits the state into the first mode. That is, when the operator wants to select one of other kinds of modes which are not mutually related while the current state is not the function OFF, he/she can recognize that an operation after the present function is turned OFF corresponds to a change into the mode of the other kind.

Processing of the operation support controller 5 for achieving such a mode operation correspondence is similar to that of FIG. 3 described above. A difference is a setting processing of the transition order according to the current state at step S102. Note that, in the following description about the transition order, "ALK" refers to the second mode, and "Lim" refers to a non-related mode (speed limiting functional ON).

The transition order which the operation support controller 5 sets at step S102 is the order described using FIG. 2B at least until three operations, and is as follows, for example. If the current state is the first mode (ACC), the state transits as ACC→ALK→OFF→Lim . . . for every operation by the operator through the mode switch 12a. If the current state is the second mode (ALK), the state transits as ALK→ACC→OFF→Lim . . . for every operation by the operator through the mode switch 12a. If the current state is the non-related mode (Lim), the state transits as Lim→OFF→ACC→ALK . . . for every operation by the operator through the mode switch 12a. If the current state is the function OFF, the state transits as OFF→ACC→ALK→Lim for every operation by the operator through the mode switch 12a.

Then, the operation support controller 5 displays the selecting operation image of one of the states in the top row of FIG. 5 on the display unit 32 at step S103, according to such a setting of the transition order. As illustrated in the images in the top row of FIG. 5, the transition order (an indicating order of OFF, ACC, ALK and Lim) differs from each other according to the current state. Further, the cursor 90 indicates the current state in each displayed image. Therefore, the operator can recognize the current state by looking at the selecting operation image in the top row of FIG. 5, and, in addition, he/she can easily understand that the mode is selectable by operating the mode switch 12a to sequentially move the cursor 90 in the order.

Subsequent processings are similarly performed as steps S104 to S109 in FIG. 3. Since the operation support controller 5 performed the processing in FIG. 3, the operator can select the first mode (ACC ON), the second mode (ACC and ALK ON), the function OFF, and the non-related mode (Speed Limiter ON) in an easily understandable manner.

Note that the transition order according to the current state includes various kinds of transitions for the fourth and subsequent operations among a series of operations until the termination of the operation is determined at step S104. For example, the state may return to the state in the top row or may return to a state in the middle row, depending on the operation by the operator through the mode switch 12a after the cursor transits to a state in the bottom row of FIG. 5. The transition order when returning from the bottom row to the top row at the fourth operation is as follows.
The current state is OFF: OFF→ACC→ALK→Lim→OFF→ACC . . . .
The current state is the first mode: ACC→ALK→OFF→Lim→ACC→ALK . . . .
The current state is the second mode: ALK→ACC→OFF→Lim→ALK→ACC . . . .
The current state is the non-related mode: Lim→OFF→ACC→ALK→Lim→OFF . . . .

The transition order when returning from the bottom row to the middle row at the fourth operation is as follows.
The current state is OFF: OFF→ACC→ALK→Lim→ALK→ACC→OFF . . . .
The current state is the first mode: ACC→ALK→OFF→Lim→OFF→ALK→ACC . . . .
The current state is the second mode: ALK→ACC→OFF→Lim→OFF→ACC→ALK . . . .
The current state is the non-related mode: Lim→OFF→ACC→ALK→ACC→OFF→Lim . . . .

Further, in a transition from the non-related mode to the first or second mode, or from the first or second mode to the non-related mode, the function OFF may be interposed in all the cases. In this case,
The current state is OFF: OFF→ACC→ALK→OFF→Lim→OFF→ACC . . . .
The current state is the first mode: ACC→ALK→OFF→Lim→OFF→ACC→ALK . . . .
The current state is the second mode: ALK→ACC→OFF→Lim→OFF→ALK→ACC . . . .
The current state is the non-related mode: Lim→OFF→ACC→ALK→OFF→Lim→OFF . . . .
Those transition orders may also be considered.

5. Conclusion and Modifications

According to the implementation described above, the following effects can be obtained. In the case of the first example described above, the mode switch 12a is configured to be a single manipulandum for selecting the first mode, the second mode and the function OFF in which ON/OFF states of the functions (ACC, ALK) which are mutually related are set, as the operation support functions of the vehicle. When the current state is either one of the first and second modes, the operation support controller 5 selects the transition order according to the current mode, and sequentially selects the mode other than the current mode and the function OFF based on the selected transition order, each time the operation by the operator through the mode switch 12a is detected. That is, the first mode and the second mode can be switched by a single operation, and thereby it is suitable when the modes are frequently switched. Further, even if the current mode is any one of the first mode and the second mode, the state can be changed into the function OFF state when the manipulandum is operated twice. Therefore, the operator can instinctively select the mode and instinctively select the mode OFF. Since the operation can be performed instinctively by a single manipulandum, the operator is less required for gazing at the manipulandum or the indication (selecting operation image). Thus, since a time period during which the operator's eyes move can be minimized, it is also suitable in terms of safety.

In the case of the second example, the mode switches 12a is configured to be a single manipulandum which can select the non-related mode (Lim) in addition to the first mode, the second mode, and the function OFF. When the current state is either one of the first and second mode, the operation support controller 5 selects the transition order according to the current mode, and sequentially selects the mode other than the current mode (the first or second mode), the function OFF, and the non-related mode based on the selected transition order, each time the operation by the operator through the mode switch 12a is detected. When the current state is the non-related mode, the operation support controller 5 selects the transition order according to the non-related mode, and sequentially selects the function OFF, the first mode, and the second mode based on the selected transition order, each time the operation by the operator through the mode switch 12a is detected. Also in this case, if the current state is either one of the first and second mode, the first mode and the second mode can be switched by a single operation, and the state can be changed into the function OFF state when the manipulandum is operated twice. The state can be changed into the non-related mode at the next operation after the function OFF is selected. Also when the current state is the non-related mode, the state can be changed into the first mode (or the second mode) as the next mode after the function OFF is selected. Thus, the operator can instinctively select the first and second modes, and can instinctively select the mode OFF and the non-related mode. Further, when transiting to the non-related mode from the first or second mode, or transiting to the first or second mode from the non-related mode, the state transition is easily understandable by the operator because the function OFF is interposed therebetween.

The selecting operation image is displayed on the display unit 32. The selecting operation image is configured to be an indication where the transition order is reflected on the current state. Further, the selecting operation image presents by the cursor 90 the currently selected state according to the operation by the operator through the mode switch 12*a*. Thus, the operator can easily understand the mode change associated with the operation of the mode switch 12*a*. Further, since the instinctive operation is possible as described above, the operator seldom needs to actually gaze at the selecting operation image. Therefore, the selecting operation image is configured so that the operator can perform a necessary minimum check. Further, in the case of the example processing of FIG. 3, the selecting operation image is displayed in response to the first operation by the operator through the mode switch 12*a*, and the operations by the operator through the mode switch 12*a* during a period of displaying the selecting operation image are treated as the operations of selecting the state. Thus, the operator can recognize that a desired mode state is selectable based on the number of operations during the displayed period of the selecting operation image, thereby improving operability. Alternatively, the first operation by the operator through the mode switch 12*a* (the operation detected at step S101) may be treated as a first operation for giving an instruction of the state transition.

Further, in the implementation described above, the first and second modes correspond to ACC and ALK, and the speed limiting function corresponds to the non-related mode ON. In this case, since the first and second modes are frequently switched, the state transition order of the implementation is very suitable. Further, since the speed limiting function is not turned ON simultaneously with ACC and ALK, the configuration which is selectable like the second example is also suitable for minimizing the number of manipulandum.

There are other actual examples of the first mode and the second mode in which the mutually related functions are set in ON/OFF state. For example, as for a lane deviation alarm function which emits an alarm when the vehicle deviates from a lane, and a lane return control function which controls the vehicle so that the vehicle actually returns to the center of a lane by applying a steering control etc., there may be an example in which the first mode turns on the lane deviation alarm function, and the second mode turns on both the lane deviation alarm function and the lane return control function. Alternatively, there may be an example in which the second mode turns off the lane deviation alarm function, and turns on the lane return control function.

Moreover, the present disclosure can also be applied to a case in which three or more modes are provided as the first to the n-th modes in which ON/OFF states of the functions which are mutually related are set. For example, if n=3,
The current mode is the first mode:
  the first mode→the second mode→the third mode→OFF . . . .
The current mode is the second mode:
  the second mode→the third mode→the first mode→OFF . . . .
The current mode is the third mode: the third mode→the first mode→the second mode→OFF . . . .
The above transition orders may also be set. That is, when the current state is either one of the first to the third modes, a transition order according to the current mode is selected, and each of the modes other than the current mode and the function OFF are sequentially selected based on the selected transition order each time the operation of the manipulandum is detected. Alternatively,
The current mode is the first mode: the first mode→the second mode→the third mode→OFF→the non-related mode . . . .
The current mode is the second mode: the second mode→the third mode→the first mode→OFF→the non-related mode . . . .
The current mode is the third mode: the third mode→the first mode→the second mode→OFF→the non-related mode . . . .
The current mode is the non-related mode: the non-related mode→OFF→the first mode→the second mode→the third mode . . . .
The above transition orders may also be set. That is, when the current state is either one of the first to the third modes, the transition order according to the current mode is selected, and each time the operation of the manipulandum is detected, each of the first to the third modes other than the current mode, the function OFF, and the non-related mode is sequentially selected according to the selected transition order. When the current state is the non-related mode, the transition order according to the non-related mode is selected, and the function OFF, each mode of the first to the n-th modes are sequentially selected according to the transition order each time the operation of the manipulandum is detected.

Further, multiple non-related modes may also be provided. For example, the first mode, the second mode, the function OFF, a first non-related mode, and a second non-related mode may be selectable by a single manipulandum. The first non-related mode and the second non-related mode are configured to be modes in which ON/OFF states of the functions which are mutually related are set. In this case,
The current mode is the first mode:
  the first mode→the second mode→OFF→the first non-related mode→the second non-related mode . . . .
The current mode is the second mode:
  the second mode→the first mode→OFF→the first non-related mode→the second non-related mode . . . .
The current mode is the first non-related mode:
  the first non-related mode→the second non-related mode→OFF→the first mode→the second mode . . . .
The current mode is the second non-related mode: the second non-related mode→the first non-related mode→OFF→the first mode→the second mode . . . .
The above transition orders may also be set. That is, it is a transition order setting which treats the first non-related mode and the second non-related mode similar to the first mode and the second mode.

The invention claimed is:
1. A vehicle control device, comprising:
  a single manipulandum that selects configured to be selectable of at least one of first to n-th modes in each of which ON/OFF states of mutually related functions are set, and a function OFF as an operation support function of a vehicle, the n being a natural number of 2 or greater; and an operation support controller configured to:
select a first transition order according to a current mode when the current mode is any one of the first to n-th modes, and
sequentially select each one of the first to n-th modes other than the current mode and then select the function OFF based on the first transition order, each time an operation of the manipulandum is detected.

2. The vehicle control device of claim 1, wherein the manipulandum is configured to be selectable of one or more non-related modes in which one or more functions that are not turned on simultaneously with the functions of the first to n-th modes are turned ON,
when the current mode is any one of the first to n-th modes, the operation support controller is configured to select the first transition order according to the current mode, and sequentially select each one of the first to n-th modes other than the current mode, select the function OFF, and then select the non-related mode based on the first transition order, each time the operation of the manipulandum is detected, and
when the current mode is the non-related mode, the operation support controller is configured to select a second transition order according to the non-related mode, and sequentially select the function OFF and then select each one of the first to n-th modes based on the second transition order, each time the operation of the manipulandum is detected.

3. The vehicle control device of claim 2, further comprising a display unit,
wherein the display unit displays a selecting operation image where a transition order selected by the operation support controller is indicated, and presents in the selecting operation image the current mode being any one of the first to n-th modes, the function OFF, and the non-related mode which has been selected currently by the operation support controller according to the operation of the manipulandum.

4. The vehicle control device of claim 2, wherein the functions of which ON/OFF states are set in the first to n-th modes include a cruise control function with an intervehicle distance control, and a lane center keep function.

5. The vehicle control device of claim 2, wherein the function that is turned on in the non-related mode is a speed limiting function.

6. The vehicle control device of claim 1, further comprising a display unit that is visible by an operator,
wherein the display unit displays a selecting operation image where a transition order selected by the operation support controller is indicated, and presents in the selecting operation image the current mode being any one of the first to n-th modes and the function OFF which has been selected currently by the operation support controller according to the operation of the manipulandum.

7. The vehicle control device of claim 1, wherein the functions of which ON/OFF states are set in the first to n-th modes include a cruise control function with an intervehicle distance control, and a lane center keep function.

8. The vehicle control device of claim 1, wherein the operation support controller is configured to change the selected current mode from any one mode of the first to n-th modes to the next mode of the first to n-th modes, when the operator pushes the single manipulandum.

* * * * *